April 9, 1940.   R. KNABLE   2,196,560
ELECTRIC VIBRATING SCRAPER
Filed Oct. 25, 1938    3 Sheets-Sheet 1

Raymond Knable
INVENTOR
BY Victor J. Evans & Co.
ATTORNEYS

April 9, 1940.   R. KNABLE   2,196,560
ELECTRIC VIBRATING SCRAPER
Filed Oct. 25, 1938   3 Sheets-Sheet 3

Raymond Knable
INVENTOR

BY Victor J. Evans & Co.
ATTORNEYS

Patented Apr. 9, 1940

2,196,560

UNITED STATES PATENT OFFICE 2,196,560

ELECTRIC VIBRATING SCRAPER

Raymond Knable, Chicago, Ill.

Application October 25, 1938, Serial No. 236,951

3 Claims. (Cl. 113—97)

My invention relates to the manufacture of cans and has among its objects and advantages the provision of an improved wiper scraper.

An object of my invention is to provide a can body side seam soldering machine wherein novel means are incorporated for wiping solder off the rotary wiper which removes the hot solder from the side seam of the tin can body. The wiper comprises a rotary element while the scraper embodies a solder removing element oscillated at high speed for wiping the solder off the wiper or buffer. The scraper is so constructed and arranged as to true the wiper, while the scraper embodies novel adjusting means for maintaining efficient operating relation between the scraper and the wiper. I arrange the scraper in such relation with respect to the wiper as to prevent the buffer from throwing or splashing solder inside the can.

In the accompanying drawings:

Figure 7 is a diagrammatic view of the scraper circuit.

Figure 1:
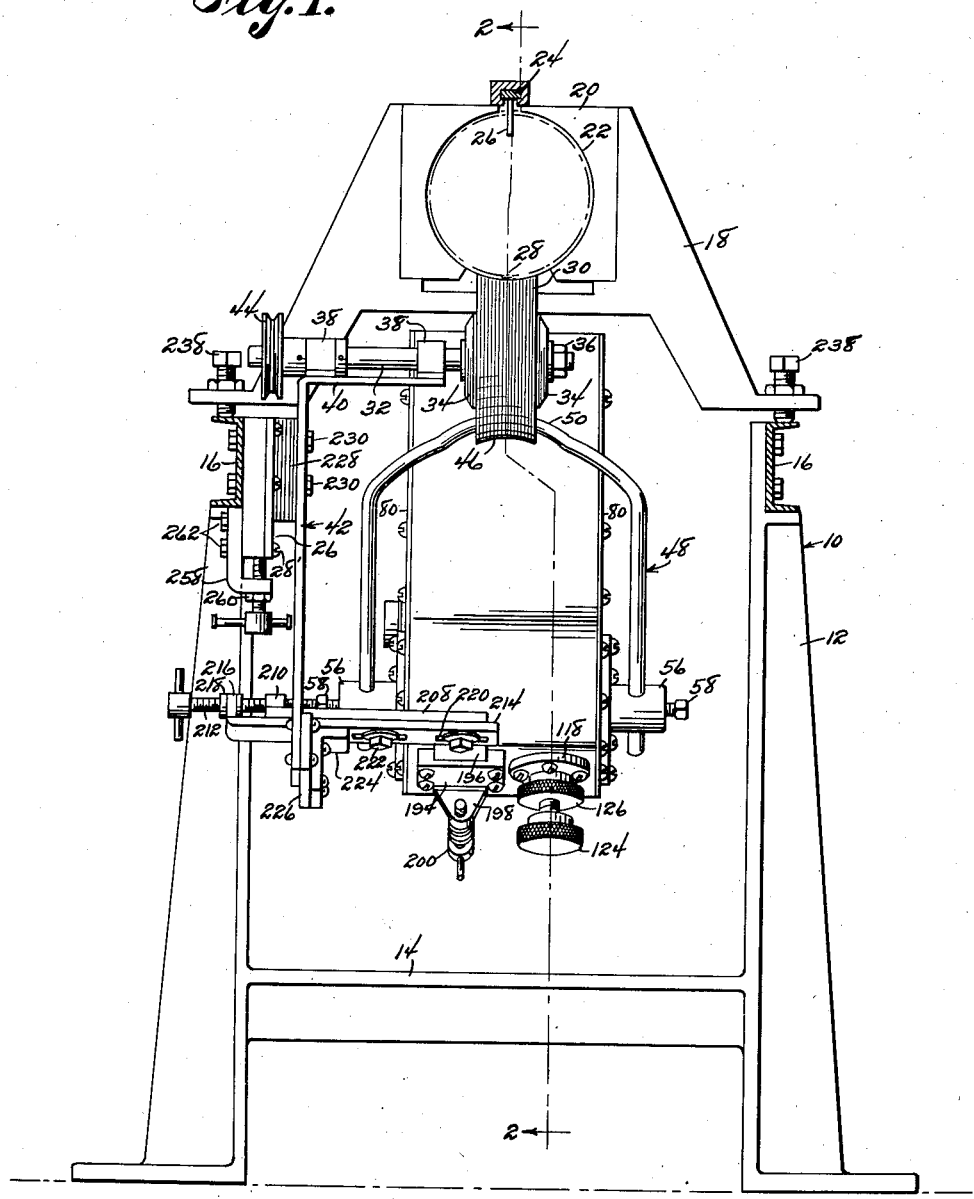
Figure 1 is an end view of a can body side seam soldering machine showing my invention applied thereto.

In the embodiment selected to illustrate my invention, the soldering machine 10 comprises legs 12 interconnected at 14 and provided with horizontal channels 16 which support a frame 18. Frame 18 carries a solder horn 20 through which the can 22 is moved through the medium of a chain 24. Chain 24 includes fingers 26 for moving cans through the solder horn. The solder horn 20 forms no part of the present invention, is well-known in the art and need not be defined in further detail. Figure 1 illustrates the can body 22 as having a seam 28 located at the bottom of the horn and arranged to be moved across the rotary wiper 30. During movement of the can body 22 through the horn 20, a quantity of solder is deposited along the side seam 28 after which the soldered cans are moved through the wiping zone.

Wiper 30 may comprise cloth discs or other suitable material mounted on a drive shaft 32 and clamped into a unitary structure by reason of plates 34. A nut 36 has threaded relation with the shaft 32 and clamps the elements of the wiper 30 into connected relation. I rotatably mount the drive shaft 32 in bearings 38 mounted on a horizontal reach 40 of a bracket 42. Shaft 32 is provided with a grooved wheel 44 for connection with a suitable source of power (not shown).

Figure 4:
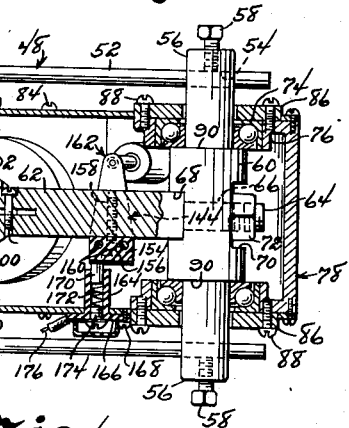
Figure 4 is a sectional view along the line 4—4 of Figure 2.
Figure 6:
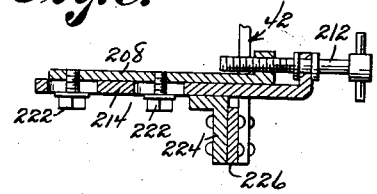
Figure 6 is a sectional view along the line 6—6 of Figure 2.

Wiper 30 is curved at 46 to conform to the curvature of the can body 22. The scraper 48 comprises wire bent to provide a bight 50 conforming to the curvature 46 and so related thereto as to scrape solder from the wiper. Scraper 48 vibrates or oscillates at a rapid speed. Figure 4 illustrates the scraper 48 as including straight reaches 52 extending through bores 54 in trunnions 56. Set screws 58 are threaded into the trunnions 56 for making the reaches 52 secure. Scraper 48 oscillates about the axis of the trunnions 56, which trunnions are reduced reaches of the shaft 60. Means for oscillating the scraper 48 comprises an arm 62 having a shank 64 extending through a bore 66 in the shaft 60. The shaft is recessed at 68 for accommodating one end of the arm 62 and at 70 for accommodating the nut 72 having threaded relation with the shank 64. Thus the arm 62 is fixedly related to the shaft 60, while the trunnions 56 are rotatably supported by thrust bearings 74. Bearings 74 are mounted within flanges 76 projecting inwardly of a housing 78 which encloses the arm 62. Housing 78 includes side plates 80 attached to the wall 82 by screws 84. Plates 86 are detachably connected with the flanges 76 by screws 88 and are arranged to cooperate with the shoulders 90 on the shaft 60 for holding the bearing assemblies in position.

Inside the housing 78 I mount coils 92 and 94 for actuating the arm 62. Each coil includes a spool 96 attached to the wall 82 by screws 98. Arm 62 includes a split head 100 recessed at 102 for the reception of soft iron plates 104 clamped in position by screws 106. Plates 104 are connected into a unitary structure by rivets 108 and the ends of the plates, which function as a core, are arranged in operative relation with the coils 92 and 94 so as to impart oscillatory motion to the arm 62.

Wall 82 is bored at 110 and 112 for the reception of sleeves 114 and 116, respectively. These sleeves are formed of insulating material and each includes a flange 118 made secure to the wall 82 by screws 120. Sleeves 114 and 116 are provided with threaded bores for the reception of screws 122 each provided with a head 124 to facilitate adjustment of the screw. Each screw may be adjusted longitudinally of its respective sleeve and is made secure against rotation through the medium of an insulated lock nut 126. Sleeve 114 carries a spring contact 128 made secure by screws 130 threaded into the sleeve. Screw 122 is provided with a tungsten point 132, while spring contact 128 includes a contacting block 134 having pressure relation with the unthreaded portion of the screw.

A spring contact 136 is attached to the sleeve 116 by screws 138 and includes a contacting block 140 arranged in pressure relation with the unthreaded portion of the screw 124. This screw includes a tungsten point 142. Upon the arm 62 I mount a brass bracket 144 which includes arms 146 and 148 provided with tungsten points 150 and 152. Point 150 is arranged to contact the point 132 on the screw 122, while point 152 is arranged to contact the point 142 on the screw 124. Figure 4 illustrates an insulated block 154 as being positioned between the bight 156 of the bracket and the arm 62. Screws 158 attach the block 154 to the arm 62, while screws 160 secure the arms 146 and 148 to the block 154. These arms extend across and beyond the arm 62 as indicated at 162 in Figure 4.

One of the plates 80 is provided with an opening for the reception of an insulated sleeve 164 including a flange 166 bearing against the outer face of the wall 80. Screws 168 clamp the flange 166 to the wall 80. Within the sleeve 164 I loosely mount a carbon brush 170 which is urged against the bight 156 by a compression spring 172. Sleeve 164 is threaded for the reception of a screw 174 which has one end abutting the spring 172. An electrical conductor 176 is connected with the screw 174, while the spring 172 is arranged in conducting relation with the screw and the carbon brush 170. Brush 170 is urged into conducting relation with the bight 156 by reason of the spring 172.

Figure 7 illustrates the electrical circuit for operating the scraper. Wire 176 is connected with a wire 178 leading to a source of current. The second wire 180 which leads to a source of current leads to the coil 92, while a wire 182 connects the wire 180 with the coil 94. The wire 184 leading from the coil 92 is electrically connected with the point 142 through the medium of the spring contact 136, the block 140 and the screw 124 illustrated structurally in Figure 2. The second wire 186 associated with the coil 92 is electrically related with the point 132 through the medium of the spring contact 128, block 134 and screw 122 illustrated structurally in Figure 2.

Figure 2:
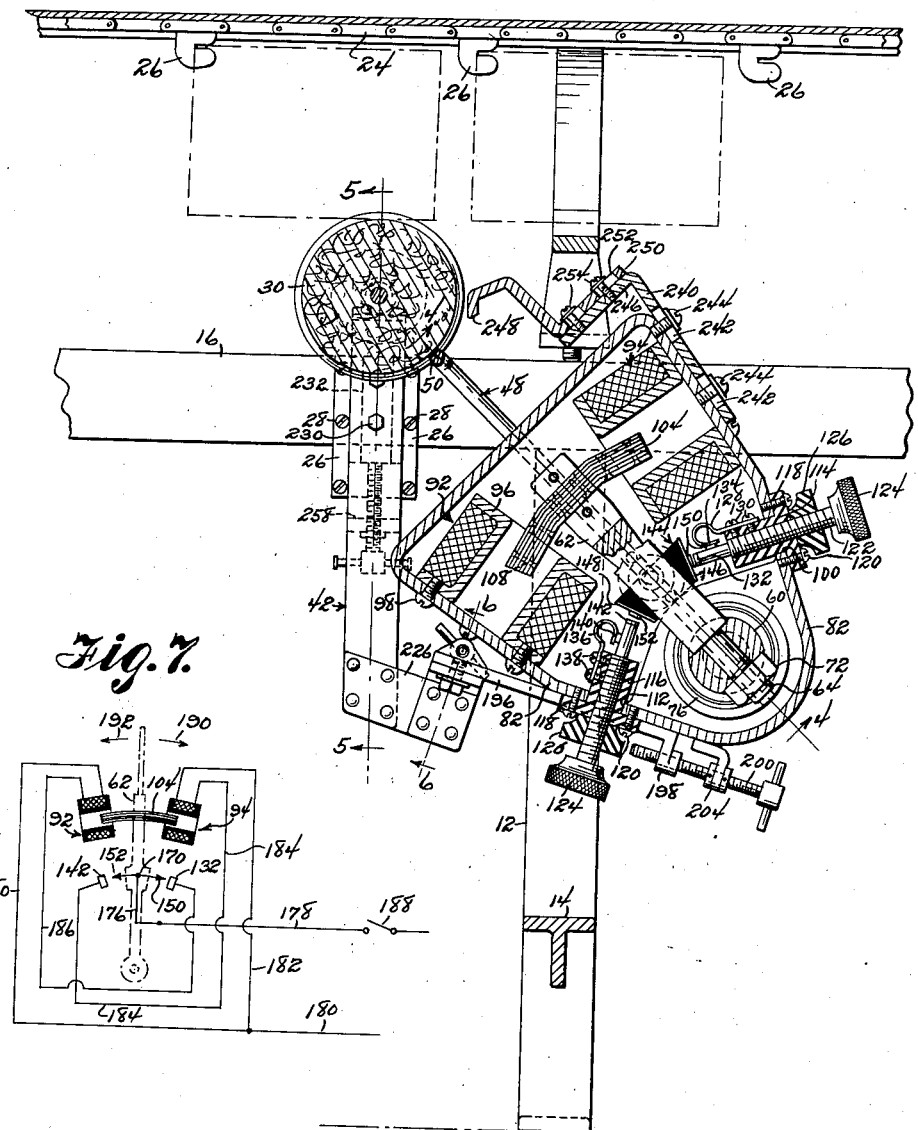
Figure 2 is a sectional view along the line 2—2 of Figure 1.
Figure 3:
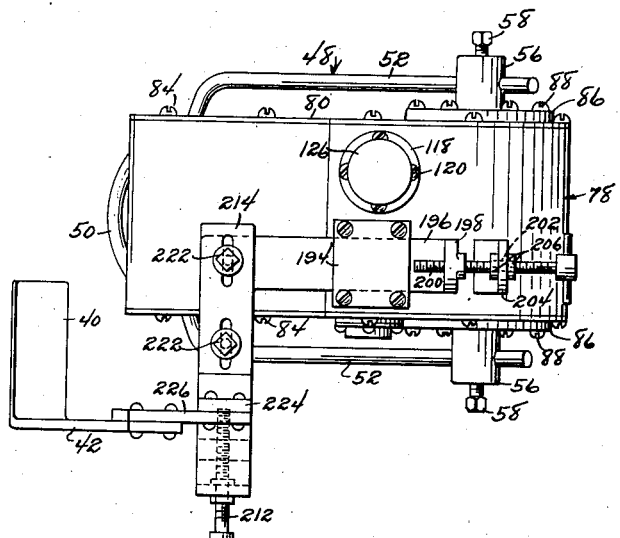
Figure 3 is a bottom plan view of the scraper mechanism and the mounting therefor.
Figure 5:
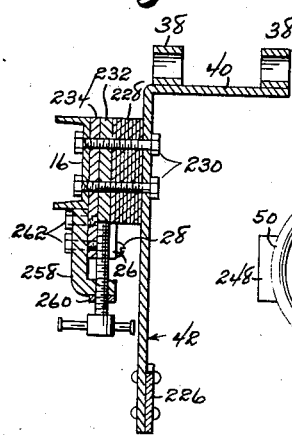
Figure 5 is a sectional view along the line 5—5 of Figure 2.

Figure 2 illustrates the arm 62 as being positioned substantially at an angle of 45° to the horizontal. Normally the weight of the arm and the core comprising the metal plates 104 is such as to bring the point 152 into pressure relation with the point 142. When the switch 188 is closed the circuit is energized as follows: wire 178, wire 176, carbon brush 170, point 152, point 142, wire 184, coil 94, wire 182 and wire 180. Energization of the coil 94 moves the arm 62 in the direction of the arrow 190. As the point 150 contacts the points 132 the circuit is closed as follows: wire 178, wire 176, carbon brush 170, point 150, point 132, wire 186, coil 92, wire 180. Energization of the coil 92 moves the arm 62 in the direction of the arrow 192 for again bringing the point 152 into electrical relation with the point 142. It will thus be seen that the coils 92 and 94 are alternately energized for oscillating the arm 62 which in turn oscillates the scraper 48. The scraper 48 is vibrated or oscillated at a high speed so that the bight or curvature 50 will effectively remove solder from the wiper 30. The scraper is so positioned with respect to the wiper 30 as to remove the solder therefrom before it can be thrown into the can body 22. In addition to removing solder from the wiper 30, the scraper performs an efficient function as a trueing device for the wiper.

To the wall 82 I connect a guide 194 which slidably supports a bar 196 having a right-angular bend 198 provided with a threaded opening for threaded connection with an adjusting screw 200. Screw 200 extends loosely through an opening 202 in a bracket 204 welded to the wall 82 and is provided with collars 206 which cooperate with opposite faces of the bracket 204 to restrain the screw 200 from relative longitudinal movement. The bight or curvature 50 of the scraper 48 may be adjusted toward and away from the wiper 30 through the medium of the adjusting screw 200. Thus the scraper may be accurately adjusted with respect to the diameter of the wiper.

Bar 196 includes a right-angular bend 208 which includes a lug 210 having a threaded bore for threaded connection with an adjusting screw 212. A bar 214 lies adjacent the right-angular bend 208 and includes a right-angular bend 216 having an opening for loosely receiving the adjusting screw 212. Collars 218 are mounted on the adjusting screw 212 for restraining the same from relative longitudinal movement. It will thus be seen that bar 214 may be shifted longitudinally of the right-angular bend 208. Bar 214 is slotted at 220 for the reception of set screws 222 threaded into the right-angular bend 208. Bar 214 may be secured in fixed relation to the right-angular bend 208 through tightening of the set screws 222. A bracket 224 is welded or otherwise secured to the bar 214 and is fixedly connected with the bracket 42 through the medium of a plate 226. Housing 78 may be adjusted laterally when viewing Fig. 1 through the medium of the adjusting screw 212. Such lateral adjustment permits the bight or curvature 50 to be accurately aligned with respect to the curvature 46 on the wiper 30.

Between the bracket 42 and one of the channels 16, I interpose shims 228. Bolts 230 extend through the bracket 42 and the shims 228 and are threaded into a block 232 slidable in a vertical guide 234 attached to the associated channel 16 by bolts 236. It will thus be seen that the bracket 42 may be shifted vertically for bodily raising or lowering the housing 78. Such adjustment shifts the wiper 30 relatively to the horn 20 so that the wiper may be accurately adjusted with respect to the can body passing through the horn. The frame 18 is provided with set screws 238 which abut the channels 16 to permit adjustment of the frame.

Housing 78 carries a bar 240 slotted at 242 for the reception of screws 244 threaded into the housing. Bar 240 includes a right-angular bend 246 upon which I adjustably mount a cleaning blade 248 for the bight or curvature 50 of the scraper. Blade 248 includes a plate 250 slotted at 252 for the reception of screws 254 threaded into the right-angular bend 246. Thus the blade 248 may be adjusted toward or away from the scraper 48 while the bar 240 may be adjusted vertically so as to bring the blade 248 into proper cleaning relation with the scraper for removing any solder which may adhere thereto. Blade 248 is curved to conform to the curvature of the bight 50 so as to effectively remove solder throughout a reach equal to the width of the wiper 30.

I claim:

1. In a machine for soldering seams in can bodies, a rotative wiper for wiping the seams, a support, a scraper for wiping solder from said wiper and journaled for oscillation in said support, an arm fixedly related to said scraper and provided with core means, and electromagnetic means coacting with said core means for rapidly vibrating the scraper across the face of said wiper.

2. In a machine for soldering side seams in can bodies, a rotative wiper having a wiping face fashioned to conform to the curvature of the can body for wiping the seams, a support, a scraper fashioned for wiping solder from said face of the wiper and journaled for oscillation in said support, an electrically actuated vibrator means carried by said support and coacting with said scraper for rapidly oscillating the latter on said face of the wiper to remove solder therefrom, and a cleaning means carried by said support and arranged to remove solder from the scraper during oscillation thereof.

3. In a machine for soldering seams in can bodies, a rotative wiper for wiping the seams, a support, a shaft journaled in said support, a scraper fixedly connected with said shaft and arranged to wipe solder from said wiper, an arm fixedly connected with said shaft and provided with core means, and a plurality of alternately and electrically energized coil means coacting with said core means for rapidly oscillating said arm for imparting oscillatory movement to said shaft and the scraper.

RAYMOND KNABLE.